Patented July 28, 1953

2,647,110

UNITED STATES PATENT OFFICE

2,647,110

2,3-DIFLUOROBUTADIENE PREPARATION AND POLYMERS THEREOF

Park A. Wiseman, Muncie, Ind., assignor to The Firestone Tire & Rubber Company, Akron, Ohio, a corporation of Ohio No Drawing. Application January 6, 1949, Serial No. 69,628

7 Claims. (Cl. 260—87.5)

This invention relates to a novel compound, 2,3-difluoro-1,3-butadiene, to its polymers and copolymers, to a method of synthesizing the same, and to the intermediate compounds involved in said synthesis.

The monomeric compound 2,3-difluoro-1,3-butadiene, to which the present invention relates, may be prepared from known starting materials by the following series of reactions:

(1)

$$CH_2=CCl-CCl=CH_2 + 2Cl_2 \longrightarrow CH_2Cl-CCl_2-CCl_2-CH_2Cl$$
$$(I) \hspace{5em} (II)$$

(2)

$$CH_2Cl-CCl_2-CCl_2-CH_2Cl + HF \xrightarrow{HgF_2}$$
$$(II)$$
$$CH_2Cl-CFCl-CFCl-CH_2Cl$$
$$(III)$$

(3)

$$CH_2Cl-CFCl-CFCl-CH_2Cl + 2Zn \longrightarrow CH_2=CF-CF=CH_2$$
$$(IV)$$

The 2,3-difluoro-1,3-butadiene (IV) is a compound boiling at 5–8° C. at atmospheric pressure, melting at —92° C. ±2° C., and having a refractive index $n_D^0$ 1.373 and a density $d_4^0$ 1.001 (these last two properties are given for 0° C., due to the high volatility of the compound). The compound may be polymerized, alone or in conjunction with other unsaturated compounds to yield products of considerable technical merit.

Reaction 1.—Chlorination of dichlorobutadiene

The 2,3-dichloro-1,3-butadiene employed as a starting material is a known compound, and may be prepared as described in either of the patents to Carothers 1,965,369 or 1,998,442. The manipulation of chlorinating the dichlorobutadiene is preferably carried out in solution in a suitable inert solvent, such as carbon tetrachloride, chloroform, or hexachlorobutadiene, since the melting point of the product 1,2,2,3,3,4-hexachlorobutane is 106° C., which is above the temperatures at which it is convenient to conduct the chlorination, namely —30° C. to 100° C., preferably —10° C. to +30° C. The chlorination reaction is greatly assisted, and the production of undesired side products is minimized, by the presence, in the reaction mass, of a small amount of a catalyst such as stannic chloride, ferric chloride, antimony (V) chloride, or the like. The product, hexachlorobutane, is a novel compound which may be used as a dielectric impregnating agent, as well as for an intermediate in the synthesis of the 2,3-difluoro-1,3-butadiene.

Reaction 2.—Fluorination of 1,2,2,3,3,4-hexachlorobutane

Reaction 2 is rather an unexpected one, since it would normally be expected that the reaction would proceed as follows:

(4)

$$CH_2Cl-CCl_2-CCl_2-CH_2Cl + HF \longrightarrow$$
$$(II)$$
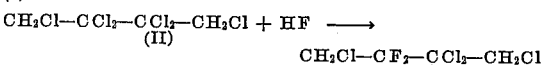

(5)

$$CH_2Cl-CF_2-CCl_2-CH_2-Cl + HF \longrightarrow$$
$$(V)$$
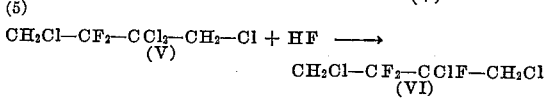

However, neither of the Compounds V or VI was found to any large extent in the final reaction product. Apparently Compound V if formed spontaneously loses hydrogen chloride or the Compound VI loses hydrogen fluoride to yield a difluorotrichlorobutene boiling at 63° C. under 50 mm. absolute pressure according to the reactions:

(4)

$$CH_2Cl-CF_2-CCl_2-CHCl \longrightarrow CH_2Cl-CF_2-CCl=CHCl+HCl$$
$$(V) \hspace{8em} (VII)$$

or (5)

$$CH_2Cl-CF_2-CClF-CH_2Cl \longrightarrow CH_2Cl-CF_2-CCl=CHCl+HF$$
$$(VI) \hspace{8em} (VII)$$

Formula VII is assigned to the difluorotrichlorobutene found in the reaction mixture, since it will not dehalogenate upon treatment with zinc. The other probable isomer $$CH_2Cl-CFCl-CF=CHCl$$
$$(VIII)$$

would be expected to dehalogenate upon treatment with zinc.

The fluorination of the hexachlorobutane (II) also leads to the production of a monofluorinated derivative as a by-product:

(6)

$$CH_2Cl-CCl_2-CCl_2-CH_2Cl+HF \longrightarrow CH_2Cl-CClF-CCl_2-CH_2Cl$$
$$(II) \hspace{8em} (IX)$$

boiling at 131–135° C. under 50 mm. absolute pressure. Upon dehalogenation by means of zinc, this Compound IX yields 2-chloro-3-fluoro-1,3-butadiene (X);

(7)

$$CH_2Cl-CCl_2-CClF-CH_2Cl+Zn \longrightarrow CH_2=CF-CCl=CH_2$$
$$(IX) \hspace{8em} (X)$$

If it is desired to prepare the pure 2,3-difluoro-1,3-butadiene of this invention it will be desirable to isolate the 1,2,3,4-tetrachloro-2,3-difluorobutane (III) from the reaction mass before dehalogenation by Reaction 3. This separation will ordinarily be effected to a large extent automatically, since the 1,2,3,3,4-pentachloro-2-fluorobutane (IX) is a solid at room temperature and will be separated along with the unreacted hexachlorobutane (II) which will ordinarily be removed by filtration. A certain proportion of the 1,2,3,3,4-pentachloro-2-fluoro-butane (IX) will nevertheless be entrained by solution in the 1,2,3,4-tetrachloro-2,3-difluoro-butane, and for substantially complete separation, distillation should be resorted to. However, if a mixture of chlorofluorobutadiene (X) and the 2,3-difluoro-1,3-butadiene (IV) is acceptable (as for instance, if it is proposed to make a copolymer of these two compounds), the entire fluorination reaction product may be subjected to dehalogenation conditions, which will result in the production of a mixture containing both of these compounds. The Compounds IV and X may, of course be separated from each other by distillation, and indeed, if the dehalogenation Reaction 3 is carried out above the boiling point (8° C. at atmospheric pressure) of Compound IV and below the boiling point (52° C. at atmospheric pressure) of Compound X, the desired 2,3-difluoro-1,3-butadiene (IV) will be volatilized from the reaction mass substantially free of the 2-chloro-3-fluoro-1,3-butadiene (X), and may be recovered in a condenser or cold trap.

The unit process of fluorinating the 1,2,2,3,3,4-hexachlorobutane may be carried out under any relatively mild fluorinating conditions calculated to replace secondary chlorine atoms with fluorine. A convenient fluorination process involves treating the hexachlorobutane with hydrogen fluoride in the presence of a catalyst such as mercuric fluoride (either supplied as such or generated in situ by reaction of the hydrogen fluoride with mercuric oxide), antimony (V) fluoride or the like. Temperatures from 0° C. to 120° C. may be used, with pressure sufficient to maintain the reactants in the liquid phase. Preferred conditions are temperatures of about 50° C., and the reaction should be continued for about 24 hours for the most satisfactory yields.

*Reaction 3.—Dehalogenation of 1,2,3,4-tetrachloro-2,3-difluorobutane*

This reaction is a straightforward removal of halogen atoms from adjacent carbon atoms by the agency of zinc, magnesium or other suitable dehalogenation procedures. The reaction is preferably carried out in a polar solvent such as methanol or formamide and proceeds smoothly with substantially quantitative yields. Inasmuch as the desired product, 2,3-difluoro-1,3-butadiene, boils at a relatively low temperature, it may be isolated from the reaction mass by distillation, preferably concurrently with its generation by the reaction. As noted above, such distillation will leave behind the greater proportion of any fluorochlorobutadiene (X) which may be present.

*The 2,3-difluoro-1,3-butadiene product*

The 2,3-difluoro-1,3-butadiene which is a chief product of this invention, is a water-white liquid boiling at 5–8° C. under atmospheric pressure, melting at —92° C. ±2° C. and having a refractive index $n_D^0$ 1.373 and a density $d_4^0$ 1.001. In common with fluorine compounds in general, it is very rapidly volatile when exposed to air. In its monomeric form it may be used as an aerosol propellant, or as a solvent for low temperature extractions.

The 2,3-difluoro-1,3-butadiene is a rather actively polymerizable monomer, and may be polymerized alone, or in conjunction with other extraneous polymerizable ethylenically unsaturated comonomers, in free-radical or ionic systems in substantially all proportions. In general, those of the resulting polymeric products containing a preponderance of 2,3-difluoro-1,3 butadiene are tough, somewhat extensible materials. Those products containing predominant proportions of various extraneous comonomers will partake predominantly of the properties of the polymers of such extraneous comonomers, modified to a greater or less extent by the presence of the 2,3-difluoro-1,3-butadiene. The presence of 5% or more of 2,3-difluoro-1,3-butadiene, based on the weight of copolymer, will significantly change the properties of the copolymer as compared to the simple polymer of the extraneous comonomer. The polymers and copolymers may be treated with various curing agents to effect cross-linking and consequent stiffening and insolubilization thereof. Suitable extraneous comonomers for copolymerization with 2,3-difluoro-1,3-butadiene include polymerizable compounds containing a single ethylenically unsaturated bond, such as vinyl compounds on the order of vinyl chloride, vinyl acetate, vinyl ethyl ether, vinyl methyl ketone, styrene, vinyl naphthalene, vinyl carbazole and the like; acrylic compounds such as acrylic and methacrylic acids, esters, nitriles and amides such as methyl methacrylate, ethyl acrylate, isobutyl acrylate, methyl α-chloro acrylate, acrylonitrile, methacrylonitrile acrylic acid, methacrylic acid, acrylamide compounds and the like; fumaric and maleic compounds such as maleic anhydride, dimethyl fumarate, diethyl maleate, maleodinitrile, β-cyano-acrylic acid and the like; and vinylidene compounds such as vinylidene chloride, vinylidene fluorochloride, isobutene and the like. Also there may be employed conjugated ethylenically-unsaturated compounds such as butadiene, isoprene, chloroprene, 2-chloro-3-fluoro-1,3-butadiene (may be derived as an unisolated by-product in the manufacture of 2,3-difluoro-1,3-butadiene); 2,3-dichlorobutadiene-1,3; 2,3-dimethyl-1,3-butadiene, piperylene and the like.

With the foregoing general discussion in mind, there are given herewith detailed examples of the practice of this invention. All parts given are by weight.

EXAMPLE I

*Preparation of 2,3-difluoro-1,3-butadiene (without isolation of 1,2,3,4-tetrachloro-2,3-difluorobutane)* a. Preparation of 1,2,2,3,3,4-hexachlorobutane:

| | Parts |
|---|---|
| 2,3-dichloro-1,3-butadiene | 772 |
| Carbon tetrachloride | 1500 |
| Stannic chloride | 1 |
| Chlorine | 888 |

A reaction vessel provided with a reflux condenser, reaction cooling means, and a bubbler for introducing gases underneath the liquid level in the vessel was provided for this preparation.

The 2,3-dichloro-1,3-butadiene, carbon tetrachloride and stannic chloride were charged into the vessel, and cooled to 0° C., which temperature was maintained throughout the succeeding reaction. The chlorine, in gaseous form, was then introduced through the bubbler, which introduction was continued as long as the solution would absorb chlorine. 888 parts of chlorine were absorbed in this manner.

On standing, the resultant solution threw down a crystalline precipitate (W), which was separated by filtration. The filtrate was then distilled to remove the carbon tetrachloride, leaving a residue of high boiling material which, on standing, threw down a further quantity of crystalline material (Y), which was separated by filtration and combined with the precipitate (W). The total crystalline material (W) plus (Y) was taken as substantially pure 1,2,2,3,3,4-hexachlorobutane and amounted to 1140 parts, or a yield of 68%. The melting point was 105°–106° C., chlorine analysis 80.85%, calculated 80.35%.

b. Fluorination of 1,2,2,3,3,4-hexachlorobutane:

|  | Parts |
| --- | --- |
| Hexachlorobutane (prepared as just described) | 133 |
| Red mercuric oxide | 163 |
| Hydrogen fluoride (liquid) | 150 |

A nickel-lined autoclave provided with a heating coil and disposed in a shaking cradle was provided for this preparation. The hexachlorobutane and red mercuric oxide were charged into the autoclave, and the temperature brought to the temperature of Dry Ice. The hydrogen fluoride was then charged and the autoclave sealed. Shaking was commenced, and the temperature raised by means of the heating coil to 125° C. over the course of three hours, which temperature and shaking were continued for an additional 18 hours. The autoclave was then cooled to 70° C., and the unreacted hydrogen fluoride vented. The material remaining in the autoclave was poured into ice water, neutralized with sodium bicarbonate, and steam distilled. The distillate separated into a liquid product (C) (18 parts) and a solid product (19 parts). The liquid product (C) was taken as the fluorinated material and was found to comprise largely the hexachlorobutane starting material in which the chlorine atoms on the secondary carbon atoms had been replaced to a greater or less extent by fluorine. Those compounds containing fluorine on both the 2- and 3-carbon atoms yield, upon dehalogenation by zinc, the 2,3-difluorobutadiene-1,3 of this invention. Those containing fluorine on only one of the 2- and 3-positions will yield 2-fluoro-3-chlorobutadiene-1,3.

c. Dehalogenation:

|  | Parts |
| --- | --- |
| Liquid fluorination product (C) (prepared as just described) | 18 |
| Zinc dust | 20 |
| Ethanol | 200 |

A reaction vessel provided with a stirrer and a water-cooled reflux condenser venting through a Dry Ice trap was provided for this reaction. The above ingredients were charged into the flask and refluxed for 24 hours, during which time three parts of a low boiling liquid (D) was collected in the Dry Ice trap. This material was taken as substantially pure 2,3-difluoro-1,3-butadiene.

One part of the liquid (D) was sealed in a tube with 5 parts of water, 0.25 part of the sodium salt of mixed 10–16 carbon atom alkyl sulfonic acids and 0.05 part of potassium persulfate. The tube was shaken at 30° C. for 18 hours, and at 75° C. for an additional 4 hours. The tube was then opened, and the contents poured into methanol. The white product which precipitated was collected and found to be non-fusible, insoluble in carbon tetrachloride, chloroform and methyl ethyl ketone, and was non-crystalline as indicated by X-rays. Fluorine analysis indicated that the material contained largely 2,3-difluoro-1,3-butadiene polymerized therein.

EXAMPLE II

*2,3-difluorobutadiene-1,3* a. Preparation of 1,2,2,3,3,4-hexachlorobutane:

|  | Parts |
| --- | --- |
| 2,3-dichlorobutadiene-1,3 (freshly distilled) | 563 |
| Carbon tetrachloride | 1000 |
| Stannic chloride | 1150 |
| Chlorine | 566 |

A reaction vessel provided with a stirring device, a gas diffuser for introducing gas beneath the liquid level and an external cooling bath was provided for this preparation. The 2,3-dichlorobutadiene-1,3 carbon tetrachloride and stannic chloride were charged into the vessel, the temperature brought to 0° C., and stirring commenced, which temperature and stirring were maintained throughout the subsequent reaction. The chlorine was then introduced through the diffuser, the entire quantity being added over the course of three hours. The reaction mass was permitted to stand at room temperature for 18 hours, during which time white crystals precipitated out of the solution. These were separated by filtration and dried, yielding 689 parts of a crude product melting at 102°–105° C. This product was dissolved in 3000 parts of boiling methanol, the solution was cooled, and the product recrystallized. The recrystallized product melted at 106°–107.5° C. and amounted to 537 parts.

b. Fluorination of 1,2,2,3,3,4-hexachlorobutane:

|  | Parts |
| --- | --- |
| 1,2,2,3,3,4 - hexachlorobutane (prepared as just described) | 795 |
| Mercuric oxide | 780 |
| Hydrogen fluoride (liquid) | 600 |

A nickel-lined autoclave mounted in a shaking mechanism and having a heating and cooling jacket was provided for this preparation. The hexachlorobutane and mercuric oxide were charged to the autoclave, and cooled to −10° C. The liquid hydrogen fluoride was then added and the autoclave sealed. Shaking was commenced, and the temperature raised to 50° C., which shaking and temperature were continued for 24 hours. The excess hydrogen fluoride was then vented and the black, mushy reaction mass discharged into cold water and washed. The washed mass was then steam distilled, and the water-immiscible distilled material was filtered to remove the solid material, which was largely unreacted 1,2,2,3,3,4-hexachlorobutane, and dried over calcium chloride. The dried liquid fluorination products, amounting to 347 parts, were then distilled under 50 mm. absolute pressure, the fraction coming over at 104°–105° C., amounting to 145 parts, being taken as substantially pure 1,2,3,4 - tetrachloro - 2,3 - difluoro - butane (III). There were also recovered a fraction distilling at 60°–65° C., consisting largely of 1,2,4-trichloro-3,3-difluoro-butene-1 (VII) and a fraction distilling at 131°–133° C. consisting largely of 1,2,2,3,4-pentachloro-3-fluoro-butane (IX).

c. Dehalogenation of 1,2,3,4-tetrachloro-2,3-difluoro-butane:

| | Parts |
|---|---|
| 1,2,3,4-tetrachloro-2,3-difluorobutane | 187 |
| Methanol: | |
| 1st portion | 100 |
| 2nd portion | 300 |
| Zinc dust | 263 |

TABLE

| Run No. | 2,3-Difluorobutadiene-1,3 Used (Parts) | Comonomer | | Polymerization Time (hrs.) | Parts Polymer Obtained | Remarks | Analysis of (Co)Polymers | | | |
|---|---|---|---|---|---|---|---|---|---|---|
| | | Type | Parts Used | | | | Fluorine (percent) | 2,3-Difluoro-1,3-butadiene (percent calculated from fluorine) | Chlorine (percent) | Comonomer (percent calculated from chlorine) |
| 1 | 11 | none | | 6 | 2 | Tough, extensible homopolymers, good tensile strength. | 42 | 100 | 0 | 0 |
| 2 | 10 | vinyl chloride | 9.5 | 25 | 4.0 | Flexible, tough, extensible copolymer. | 39.9 | 95 | 2.85 | 5 |
| 3 | 10 | vinylidene chloride. | 10 | 25 | 9.0 | Noncrystalline, slow recovery from extension. | 29.15 | 69 | 22.8 | 31 |
| 4 | 10 | acrylonitrile | 11 | 25 | 6.5 | Copolymer is flexible at 100° C. Stiff at room temperature. | 27.83 | 66 | | |
| 5 | 8.5 | 2,3-dichloro-1,3-butadiene. | 10.5 | 25 | 10.3 | Resinous copolymer | 2.95 | 7.0 | 55.2 | 95 |

For this preparation there was provided a reaction vessel venting through a reflux condenser to a train comprising a calcium chloride drying tube followed by a final condenser cooled to −70° C. A dropping funnel was provided for introducing reactants into the reaction vessel, and a connection was provided for introducing nitrogen into the free space above the reactants in the vessel.

The zinc dust and second portion of the methanol were charged into the reaction vessel, and nitrogen introduced to purge the system of air. The 1,2,3,4-tetrachloro-2,3-difluoro-butane and first portion of the methanol were dissolved together and introduced dropwise into the reaction vessel. The temperature rose until the methanol commenced to reflux, the gaseous product passing through the reflux condenser and drying tube to be condensed in the final condenser at −70° C. There was obtained 70 grams of 2,3-difluoro-1,3-butadiene. Properties of the compound are $n_D^0$ 1.373, $d_4^0$ 1.001, M. P. −92° C. ±2° C., B. P. 5–8° C.

EXAMPLE III

*Polymers and copolymers of 2,3-difluorobutadiene-1,3*

| | |
|---|---|
| 2,3-difluorobutadiene-1,3 (prepared as described in Example II). | 8.5–11 parts, per table. |
| Comonomer (per table) | 0–11 parts, per table. |
| Water | 50 parts. |
| Potassium persulfate | .01 part. |
| Mixed lauryl and myristyl sodium sulfates. | .05 part. |

A series of polymerization and copolymerization runs was made, using the 2,3-difluorobutadiene-1,3 alone and in combination with other polymerizable comonomers. In each run, the 2,3-difluorobutadiene-1,3 and comonomer, in the respective quantities set forth in the table, and the water, potassium persulfate and lauryl and myristyl sodium sulfates, were charged into a bottle which was placed in a polymerization wheel which repeatedly dipped and revolved the bottle in a water bath maintained at 50° C. The resultant latex was coagulated by addition of methanol, and the curd dewatered and washed on a filter and dried. Particulars of the several runs are set forth herewith in the table.

From the foregoing general discussion and detailed specific examples, it will be evident that this invention provides a novel process, and a series of novel chemical compounds, leading up to the synthesis of a novel polymerizable compound, 2,3-difluoro-1,3-butadiene. The process is relatively simple, and may be carried out in readily procurable equipment without excessive technical supervision. Of the intermediate compounds, the 1,2,2,3,3,4-hexachlorobutane is useful in itself as an impregnating agent. The fluorinated intermediates and by-products are useful as solvents. The polymers and copolymers of 2,3-difluoro-1,3-butadiene are materials of considerable technical interest and merit. The polymers and copolymers are useful as gasket materials, fabric coatings, films and the like.

What is claimed is:

1. Process which comprises dehalogenating 1,2,3,4-tetrachloro-2,3-difluoro-butane to yield 2,3-difluoro-1,3-butadiene.

2. Process which comprises treating 1,2,3,4-tetrachloro-2,3-difluoro-butane with zinc to produce 2,3-difluoro-1,3-butadiene.

3. Solid polymeric 2,3-difluoro-1,3-butadiene.

4. Solid homopolymers of 2,3-difluoro-1,3-butadiene.

5. A solid copolymer of 2,3-difluoro-1,3-butadiene and 2,3-dichloro-1,3-butadiene.

6. A solid copolymer of 2,3-difluoro-1,3-butadiene and vinylidene chloride.

7. A solid copolymer of 2,3-difluoro-1,3-butadiene and vinyl chloride.

PARK A. WISEMAN.

References Cited in the file of this patent

UNITED STATES PATENTS

| Number | Name | Date |
|---|---|---|
| 1,930,129 | Midgeley | Oct. 10, 1933 |
| 1,964,720 | Coffman | July 3, 1934 |
| 1,998,442 | Carothers et al. | Apr. 23, 1935 |
| 2,308,903 | Wimmer | Jan. 19, 1943 |
| 2,446,382 | Mochel | Aug. 3, 1948 |